United States Patent
Albrecht

(10) Patent No.: US 10,364,899 B2
(45) Date of Patent: Jul. 30, 2019

(54) VALVE, IN PARTICULAR VACUUM VALVE

(71) Applicant: VAT Holding AG, Haag (CH)

(72) Inventor: Klaus Albrecht, Lustenau (AT)

(73) Assignee: VAT HOLDING AG, Haag (CH)

( * ) Notice: Subject to any disclaimer, the term of this patent is extended or adjusted under 35 U.S.C. 154(b) by 56 days.

(21) Appl. No.: 15/557,959

(22) PCT Filed: Mar. 10, 2016

(86) PCT No.: PCT/EP2016/055136
§ 371 (c)(1),
(2) Date: Sep. 13, 2017

(87) PCT Pub. No.: WO2016/156001
PCT Pub. Date: Oct. 6, 2016

(65) Prior Publication Data
US 2018/0051813 A1 Feb. 22, 2018

(30) Foreign Application Priority Data

Mar. 27, 2015 (AT) .................................. A 182/2015

(51) Int. Cl.
*F16K 3/02* (2006.01)
*F16K 51/02* (2006.01)
(Continued)

(52) U.S. Cl.
CPC .............. *F16K 3/0236* (2013.01); *F16K 1/12* (2013.01); *F16K 3/029* (2013.01); *F16K 3/0263* (2013.01);
(Continued)

(58) Field of Classification Search
CPC . F16K 3/0236; F16K 3/18; F16K 1/12; F16K 3/04; F16K 3/0263; F16K 3/029;
(Continued)

(56) References Cited

U.S. PATENT DOCUMENTS 4,856,758 A * 8/1989 Knapp ................ F16K 11/0782
251/368
5,275,377 A 1/1994 Rubner
(Continued)

FOREIGN PATENT DOCUMENTS

CN 1264142 8/2000
CN 103574139 2/2014
(Continued)

OTHER PUBLICATIONS

Technical data concerning surface roughness posted on website of Mitsubishi Hitachi Tool Engineering, Ltd, 1 pg.

*Primary Examiner* — John Bastianelli
(74) *Attorney, Agent, or Firm* — Volpe and Koenig, P.C.

(57) ABSTRACT

A valve (1), in particular a vacuum valve, having at least one valve housing (2), at least one closure element (3), and at least one valve seat (4). The valve seat (4) surrounds at least one valve opening (5) of the valve (1), and the closure element (3) can be moved back and forth between at least one open position, in which the closure element (3) at least partly releases the valve opening (5), and a closed position, in which a sealing surface (8) of the closure element (3) is pressed against the valve seat (4) in order to close the valve opening (5), by at least one closure element drive (6, 7). At least one surface (9) of the valve (1) has an average surface roughness RZ less than or equal to 0.4 um, preferably less than or equal to 0.25 um.

10 Claims, 4 Drawing Sheets

(51) Int. Cl.
*F16K 3/06* (2006.01)
*F16K 3/12* (2006.01)
*F16K 3/18* (2006.01)
*F16K 25/00* (2006.01)
*F16K 1/12* (2006.01)
*F16K 3/04* (2006.01)

(52) U.S. Cl.
CPC ............... *F16K 3/04* (2013.01); *F16K 3/06* (2013.01); *F16K 3/12* (2013.01); *F16K 3/18* (2013.01); *F16K 3/188* (2013.01); *F16K 25/005* (2013.01); *F16K 51/02* (2013.01)

(58) Field of Classification Search
CPC . F16K 51/02; F16K 3/188; F16K 3/12; F16K 3/06; F16K 25/005
USPC .......................................... 251/209, 326–329
See application file for complete search history.

(56) References Cited

U.S. PATENT DOCUMENTS

| | | | |
|---|---|---|---|
| 5,621,648 A * | 4/1997 | Crump | G06T 17/00 700/112 |
| 5,711,824 A * | 1/1998 | Shinohara | H01L 31/022425 136/256 |
| 6,346,683 B1 | 2/2002 | Okutomi et al. | |
| 9,086,173 B2 | 7/2015 | Ehrne | |
| 2002/0155632 A1 | 10/2002 | Yamazaki et al. | |
| 2006/0255722 A1* | 11/2006 | Imanishi | H01L 51/5206 313/504 |
| 2007/0190310 A1* | 8/2007 | Yusa | B29C 37/0032 428/323 |
| 2008/0038453 A1* | 2/2008 | Yusa | C08J 7/065 427/155 |
| 2009/0001373 A1* | 1/2009 | Ochi | H01L 29/458 257/59 |
| 2009/0302257 A1 | 12/2009 | Gehrig et al. | |
| 2012/0298915 A1* | 11/2012 | Okuda | C08J 3/12 252/194 |
| 2013/0199705 A1 | 8/2013 | Larson et al. | |
| 2014/0246163 A1* | 9/2014 | Yamaguchi | B22D 19/00 164/284 |
| 2015/0033941 A1 | 2/2015 | Kouketsu et al. | |
| 2016/0040789 A1 | 2/2016 | Bestebner | |

FOREIGN PATENT DOCUMENTS

| | | |
|---|---|---|
| DE | 4212874 | 10/1993 |
| EP | 2985497 | 2/2016 |
| JP | 2001023908 | 1/2001 |
| JP | 2005265149 | 9/2005 |
| JP | 2006170275 | 6/2006 |
| WO | 2008046048 | 4/2008 |

* cited by examiner

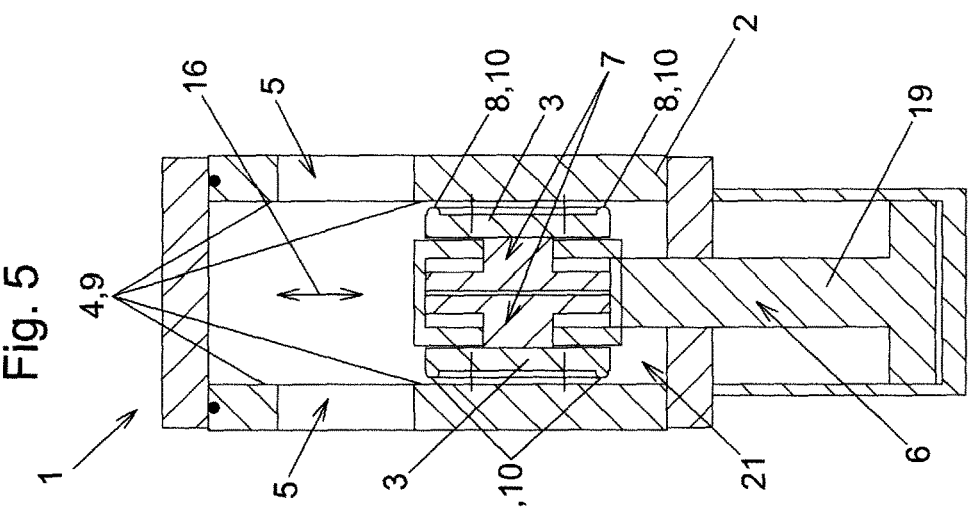
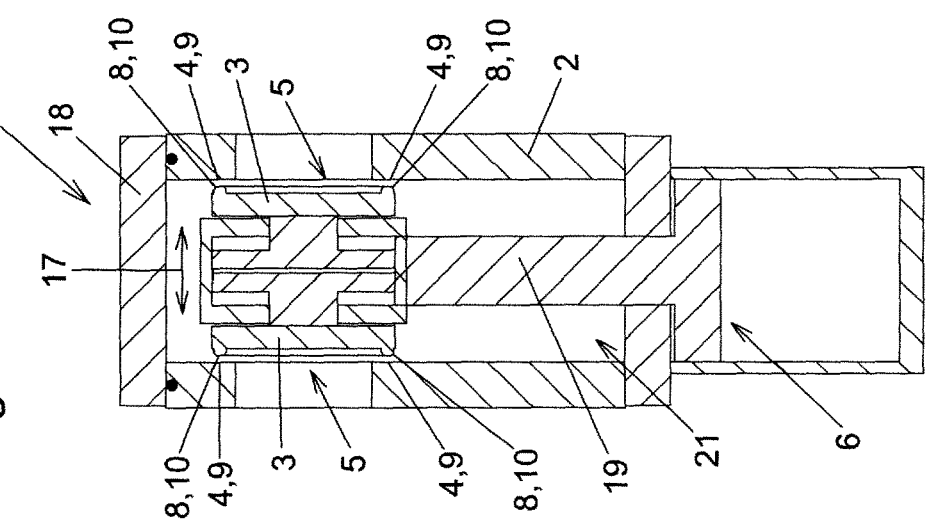
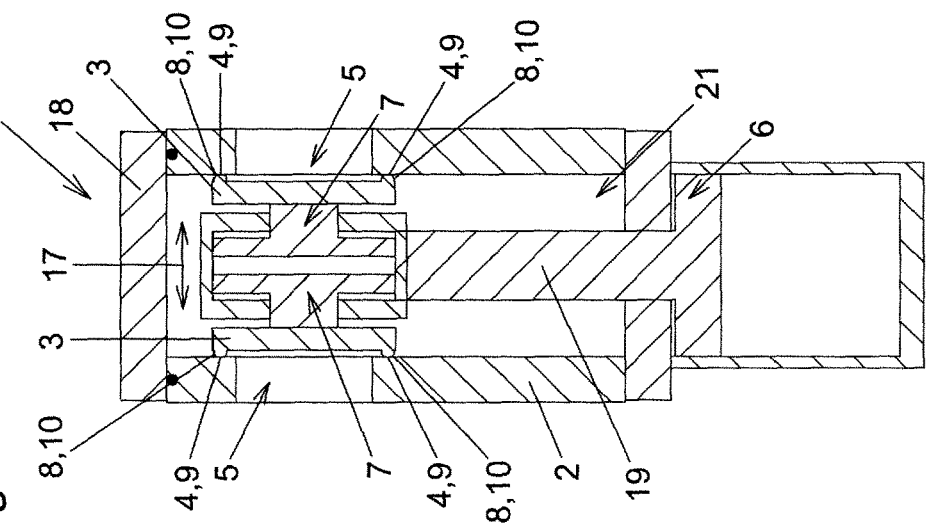

VALVE, IN PARTICULAR VACUUM VALVE

BACKGROUND

The present invention relates to a valve, in particular a vacuum valve, having at least one valve housing and at least one closure member and at least one valve seat, wherein the valve seat surrounds at least one valve opening of the valve and the closure member is movable back and forth by at least one closure member drive between at least one open position, in which the closure member at least partially clears the valve opening, and a closed position, in which the closure member is pressed against the valve seat by way of a sealing surface of the closure member in order to close the valve opening.

Valves of this type are used in particular as vacuum valves inter alia when production or machining processes have to be carried out in a defined atmosphere under defined pressure conditions and in particular in what is known as a vacuum, that is to say under negative pressure. To this end, the valves can be used to connect chambers, for example process chambers or transfer chambers, together in a closable and pressure-resistant manner. The valve housing of the valves is, in such applications, frequently attached to a chamber wall of the corresponding chamber. Integrated configurations are also possible. The valve opening of the valve is then usually aligned with a corresponding chamber opening. If the closure member is in the open position, the valve opening is at least partially cleared and workpieces to be machined can be introduced into the corresponding chamber or removed therefrom. If the valve is in the closed position, the chamber is sealed off and the conditions, in particular pressure conditions, required for the particular process can be set. Valves of the abovementioned type can also be what are known as metering valves, however, in which the valve is used to meter a fluid, in particular gas, into a chamber or the like.

In order for it to be possible to carry out the particular processes, it is usually very important to reduce, or at best entirely prevent, the introduction, creation and transport of undesired particles as far as possible.

SUMMARY

The object of the invention is to improve valves of the abovementioned type in this regard.

To this end, the invention provides that at least one surface of the valve has an average roughness depth RZ less than or equal to 0.4 μm (micrometers), preferably less than or equal to 0.25 μm.

In other words, the invention provides for at least certain surfaces of the valve to be configured in a very smooth manner, namely with very little roughness. As a result, as explained in more detail below, both the adhesion and production of disruptive particles can be reduced considerably. The average roughness depth RZ that indicates the roughness is determined in accordance with DIN EN ISO 4287. Therefore, this does not have to be explained any further. The measurement of the RZ value should preferably be carried out by means of contactless interference microscopy. Measuring instruments that are suitable for this purpose and are commercially available are for example the white light interferometer WLI MarSurf CW100 from Mahr, the Wyko NT1100 from Veeco and the InfiniteFocus G5 from Alicona.

The surfaces of the valve having the roughness or smoothness according to the invention are preferably surfaces that are milled and/or turned to a shiny finish. In this connection, in a method for producing a valve according to the invention, the surface is milled and/or turned to a shiny finish. As a result of the milling to a shiny finish and the turning to a shiny finish, formation of micro-burrs at the profile tips in the surface can be avoided.

The surface can be made for example of aluminum or of an aluminum alloy or at least exhibit such a material. In this case, aluminum alloys of the 5000 series or of the 6000 series in accordance with EN 573-3:2007(D) are particularly preferred. Aluminum alloys that are considered to be particularly preferred are the types 5083, 6061 and/or 6082 mentioned in said standard. Alternatives to aluminum can be for example of stainless steel. Provision can thus also be made for said surfaces of the valve to consist of stainless steel or to exhibit such a material.

Particularly preferably, surfaces according to the invention are used in what are known as dynamic seals, that is to say in seals which are opened and closed during operation of the valve. Thus, in particularly preferred configurations of the invention, the surface with the low roughness in accordance with the invention, or the high smoothness in accordance with the invention, is formed on the valve seat of the valve housing and/or on the sealing surface of the closure member. As a result, the particle formation at friction surfaces during opening and closing of the closure member is reduced considerably compared with the prior art, in particular in applications in which a seal, for example a rubber or some other elastomer seal, of the valve is pressed against the surface in the closed position and the seal is raised from the surface again in the open position. As a result of the smooth surface in accordance with the invention, abrasion at the seal during opening and closing of the closure member is reduced so much that very greatly reduced particle formation, if any, now occurs compared with the prior art. Elastomer seals can be used without any additional treatment.

Smooth surfaces in accordance with the invention can, however, be used not only in dynamic seals but also in static seals in order to reduce particle creation. In this connection, provision can thus also be made for the surface to be formed on a sealing seat of the valve against which a seal is permanently pressed during operation of the valve. In this case, care should be taken to ensure that a certain movement of the components in contact with one another as a result of pressure buildup and pressure reduction can occur even in the region of such static seals, and so it also makes sense here to reduce particle creation as much as possible, or to avoid it entirely, by way of a correspondingly smooth surface.

In addition to the abovementioned sealing surfaces, valve seats and sealing seats, surfaces according to the invention can also be used on other sub-regions of the valve, however. A particularly preferred example that can be mentioned in this regard is that the surface is formed at least on a subregion of the valve housing and/or of the closure member which comes into contact with process fluids, in particular with process gases, during operation of the valve. This in particular prevents particles from being able to settle on the surfaces, configured to be very smooth according to the invention, of said sub-regions of the valve housing or of the closure member. As a result, the surfaces can also be cleaned very easily and effectively. A further effect here is that, as a result of the low degree of particle adhesion on these surfaces, more rapid pumping of the process fluids or gases out of the process chambers equipped with valves according to the invention is possible.

Particularly preferably, the surfaces of the valve having said low roughness in accordance with the invention are configured as optically reflective surfaces. This, too, prevents these surfaces and thus also the valve housing and/or the closure member from heating up unnecessarily on account of thermal radiation in the process chambers. The thermal radiation is at least largely reflected at the surfaces according to the invention and is thus retained for the process in an energy-saving manner by reflection. This results in less heating up of the components of the valve. As a result, it is also possible to use more cost-effective materials such as elastomer seals, for example, in hotter processes or aluminum or aluminum alloys instead of austenitic steel or stainless steel. Furthermore, as a result, lower temperatures in the valve drive and generally lower thermal loads on the components need to be taken into consideration. In this connection, in preferred configurations of the invention, the surface has a reflectance for electromagnetic radiation of at least 0.8, preferably at least 0.9. These reflectances should preferably be achieved in the wavelength range between 0.01 μm (micrometers) and 1000 μm, in particular in the range of thermal radiation, that is to say infrared radiation, and of visible light. The reflectance comprises both the portion of incident electromagnetic radiation that is reflected directly and the portion that is reflected in a scattered manner, and can be measured for example with an Ulbricht sphere.

Valves according to the invention can be configured such that the valve opening serves for workpieces to be machined to be able to be transported through the valve opening. The size of the valve opening can then be adapted to the size of the workpieces to be transported through. In these configurations, the closure member or closure members can be configured in a plate- or disk-like manner. Such valves can also be referred to as transfer valves. It is equally possible, however, for valves according to the invention also to be what are known as gas metering valves. In the latter, the closure members can be shaped for example in the form of a spike, conically or the like. In the case of dynamic sealing surfaces, the seal known per se can be arranged both on the valve seat of the valve housing and on the sealing surface of the closure member. The other surface that corresponds in each case thereto, or interacts with the seal in the closed position of the closure member, then advantageously has the smoothness or low roughness according to the invention.

As already indicated, valves according to the invention are preferably used in what is known as vacuum technology. Generally, the term vacuum technology is used when operating states with pressures less than or equal to 0.001 mbar (millibar) or 0.1 pascal are achieved. Vacuum valves are valves which are designed for these pressure ranges and/or corresponding pressure differences with respect to the surroundings. The term vacuum valves can also be generally used, however, when they are designed for pressures lower than normal pressure, i.e. under 1 bar.

BRIEF DESCRIPTION OF THE DRAWINGS

Further advantages and details of the invention are explained by way of example in the following text with reference to exemplary embodiments. In the figures:

FIGS. 1 to 5 show illustrations of a first exemplary embodiment according to the invention of a valve;

DETAILED DESCRIPTION OF THE PREFERRED EMBODIMENTS

In the first exemplary embodiment, which is shown schematically in FIGS. 1 to 5, the valve is a vacuum valve in which two closure members 3 are provided which each carry out an L-shaped movement between their open position according to FIG. 5 and their closed position according to FIG. 3. Such valves 1 are also referred to in general as L-valves in the prior art.

Figure 1:
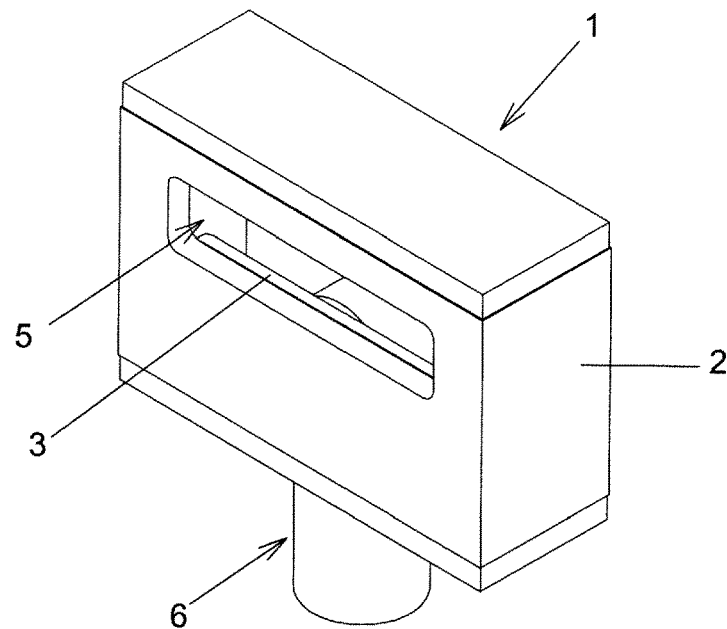
Figure 2:
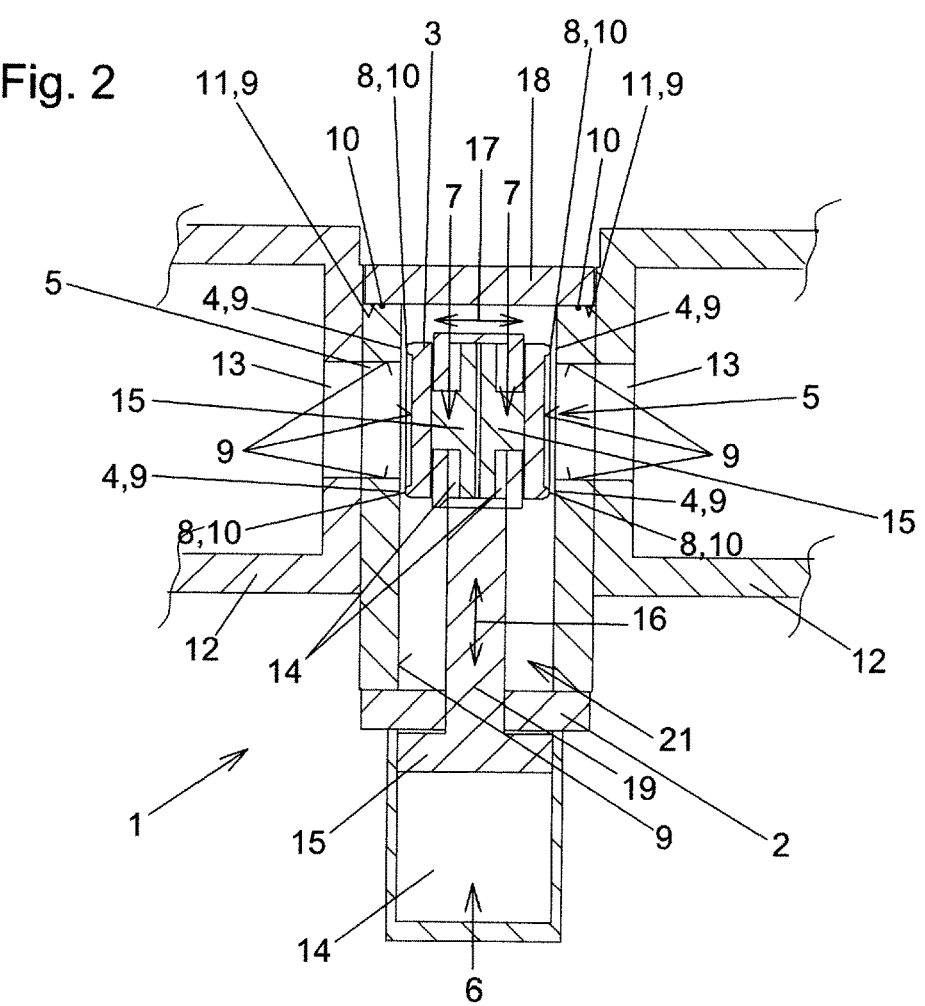

FIG. 1 shows an exterior view of the valve housing 2 of the valve 1. In FIG. 1, the closure members 3 are in their open position, in which they completely clear the valve opening 5 in this exemplary embodiment. In FIGS. 2 to 5, longitudinal sections through the valve 1 are drawn in each case. FIG. 2 illustrates how the valve 1 is arranged between two only partially indicated chambers 12 in order to connect the chamber openings 13 thereof in a closable manner by the valve opening 5. As known per se in the prior art, the chambers 12 can be process chambers in which machining and/or production processes are carried out under a defined atmosphere and defined pressure conditions. It is equally possible, however, for them also to be what are known as transfer chambers, which serve to transfer workpieces to be machined from one process chamber into another process chamber. The chambers 12 are not illustrated in FIGS. 3 to 5.

In order to be able to move the closure members 3 of this exemplary embodiment back and forth between the open position according to FIG. 5, an intermediate position illustrated in FIGS. 2 and 4, and the closed position illustrated in FIG. 3, the two closure member drives 6 and 7 in this exemplary embodiment are provided. By use of the closure member drive 6, the closure members 3 are moved back and forth in linear movements in the directions of movement 16 between the open position according to FIG. 5 and the intermediate position according to FIGS. 2 and 4. In the exemplary embodiment shown, the closure member drive 6 is a piston/cylinder arrangement having the cylinder 14 and the piston 15, which is displaceable in a known manner therein. The piston 15 is fixedly connected to the valve rod 19. On the side of the valve rod 19 that is remote from the piston 15, the closure member drives 7 and the closure members 3 are located. In this exemplary embodiment, the closure member drives 7 are also configured as piston/cylinder arrangements with in each case one cylinder 14 and one piston 15. Fastened to each piston 15 of each closure member drive 7 is a closure member 3. By use of the closure member drives 7, the closure members 3 can be moved back and forth in the second, in this case likewise linear, directions of movement 17 between the intermediate position according to FIGS. 2 and 4 and the closed position according to FIG. 3. The configuration of such closure member drives 6 and 7 is known per se from the prior art and is illustrated only schematically and by way of example here. In principle, the invention can be realized with a wide variety of closure member drives 6 and/or 7 that are known per se. It is possible for only one closure member drive or a plurality of closure member drives to be provided for a valve according to the invention.

The closure members 3, which are configured in a plate- or disk-like manner, are located in all of their operating positions in an interior 21 of the valve housing 2. The valve seats 4, against which the closure members 3 are pushed in their closed position, are located on the corresponding inner sides of the valve housing 2 in the exemplary embodiment shown. Formed on each of the closure members 3 are sealing surfaces 8, which, in this exemplary embodiment, each bear the seals 10 which are pressed against the valve seats 4 in the closed position of the closure members 3 and are raised from the valve seats 4 in the intermediate position and in the open position. Of course, the seals 10 could also be formed on the valve seats 4 and be pressed against the sealing surfaces 8 of the closure members 3 only in the closed position. The seals 10 can also be integrated in one piece into the valve seats 4 or the sealing surfaces 8. Given a corresponding configuration of valve seats 4 and sealing surfaces 8, it is also possible to dispense with separate seals 10 entirely.

In order for it to be possible to carry out maintenance work on the closure members 3, the closure member drives 7 or generally in the interior 21 of the valve housing 2, a part of the valve housing 2 is configured to be removable, in the form of the lid 18, from the rest of the valve housing 2. In order to seal off the lid, seals 10 are likewise present, which are each pressed against the corresponding sealing seat 11 of the cover 18.

These features of the valve 1, or vacuum valve, are known per se from the prior art and have only been explained by way of example here.

According to the invention, provision is now made in this exemplary embodiment for various surfaces 9 on the valve housing 2 and on the closure member 3 to have an average roughness depth RZ of less than or equal to 0.4 µm, preferably less than or equal to 0.25 µm, in order to reduce particle formation and particle adhesion. In the exemplary embodiment shown, these are first of all the valve seats 4, which are embodied with correspondingly smooth surfaces 9 in accordance with the invention. The seal 10 on the closure members 3 and the valve seats 4 together each form dynamic seals, in the case of which, when the closure members 3 are opened and closed, particle formation occurs due to friction in the prior art. As a result of the configuration according to the invention of the valve seats 4 in the form of correspondingly smooth surfaces 9, the particle formation at these friction surfaces is considerably reduced, or preferably completely avoided, compared with the prior art.

In this exemplary embodiment, the sealing seats 11 on the cover 18 and the seals 10 assigned thereto form what are known as static seals, which are not opened or separated from one another during normal operation of the valve 1. Nevertheless, in the event of pressure buildup and of pressure reduction, a degree of movement occurs even at these sealing surfaces and thus undesired particle formation also occurs to a certain extent in the prior art. In order to avoid this, in the exemplary embodiment shown here, the sealing seats 11 on the cover 18 are likewise embodied as surfaces 9 which have an average roughness depth RZ of less than or equal to 0.4 µm, preferably less than or equal to 0.25 µm. As a result, the particle formation is at least reduced, preferably entirely avoided, even at these static sealing surfaces, as they are known.

Furthermore, in this exemplary embodiment, smooth surfaces 9 in accordance with the invention are formed on all sub-regions of the valve housing 2 and of the closure member 3 which come into contact with process fluids or gases during operation of the valve 1. As a result, much less adhesion of particles to these surfaces of the valve housing 2 and of the closure members 3 occurs, with the result that these surfaces can also be cleaned much better. The low particle adhesion to these surfaces also allows more rapid pressure reduction and buildup in the valve 1 and in the chambers 12.

Preferably, these surfaces 9 are embodied as optically reflective surfaces, which preferably have a reflectance for electromagnetic radiation of at least 0.8, preferably of at least 0.9. As a result, enhanced reflection of the process heat arising in the chambers 12 occurs. Undesired heating up of the corresponding surfaces or walls is greatly reduced or avoided as a result of this strong reflection of the thermal radiation, resulting overall in less energy loss and thus also less energy input while the processes are being carried out in the chambers 12. Furthermore, reference is once again made to the further advantages, already mentioned at the beginning, of such strongly thermally reflective surfaces 9.

Thus, in this first exemplary embodiment, all relevant surfaces are embodied as surfaces 9 according to the invention with low roughness in accordance with the invention. Of course, this does not have to be the case, and it is also possible for fewer and/or other surfaces on such or other valves 1 to be equipped with correspondingly smooth surfaces 9 in accordance with the invention.

Figure 6:
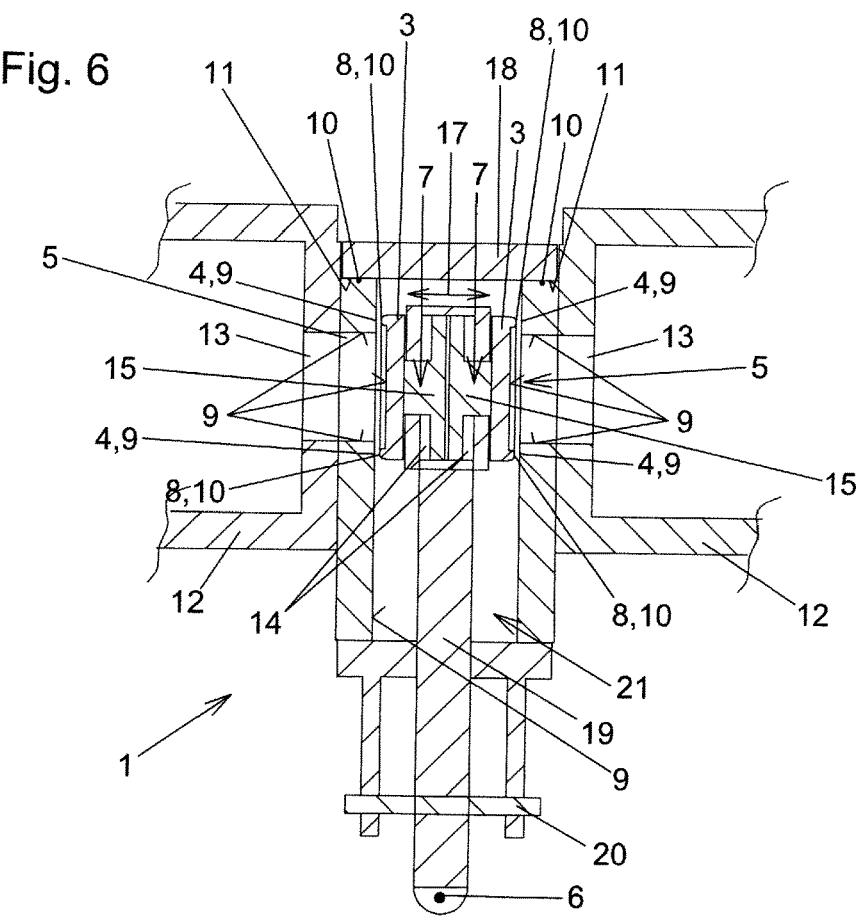
FIGS. 6 and 7 show a second exemplary embodiment of a valve according to the invention.
Figure 7:
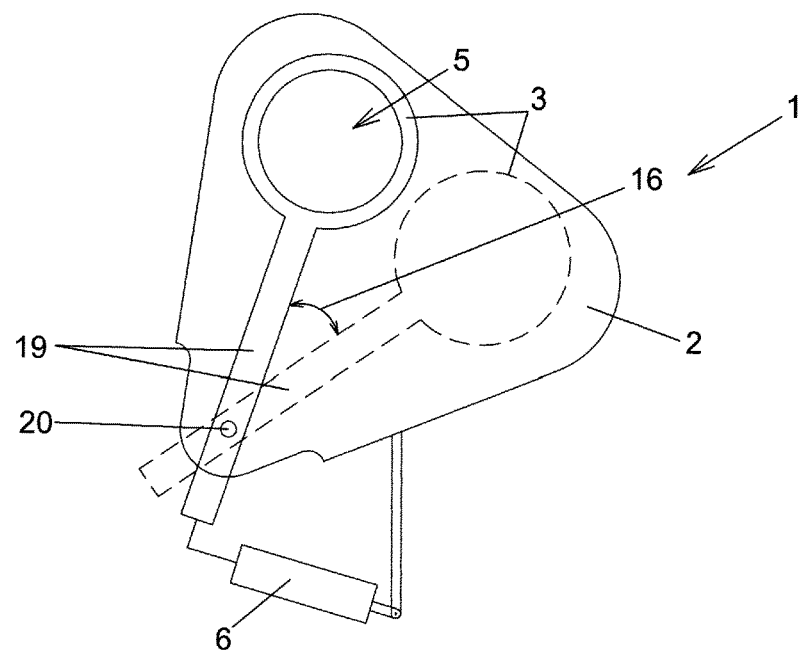
Figure 8:
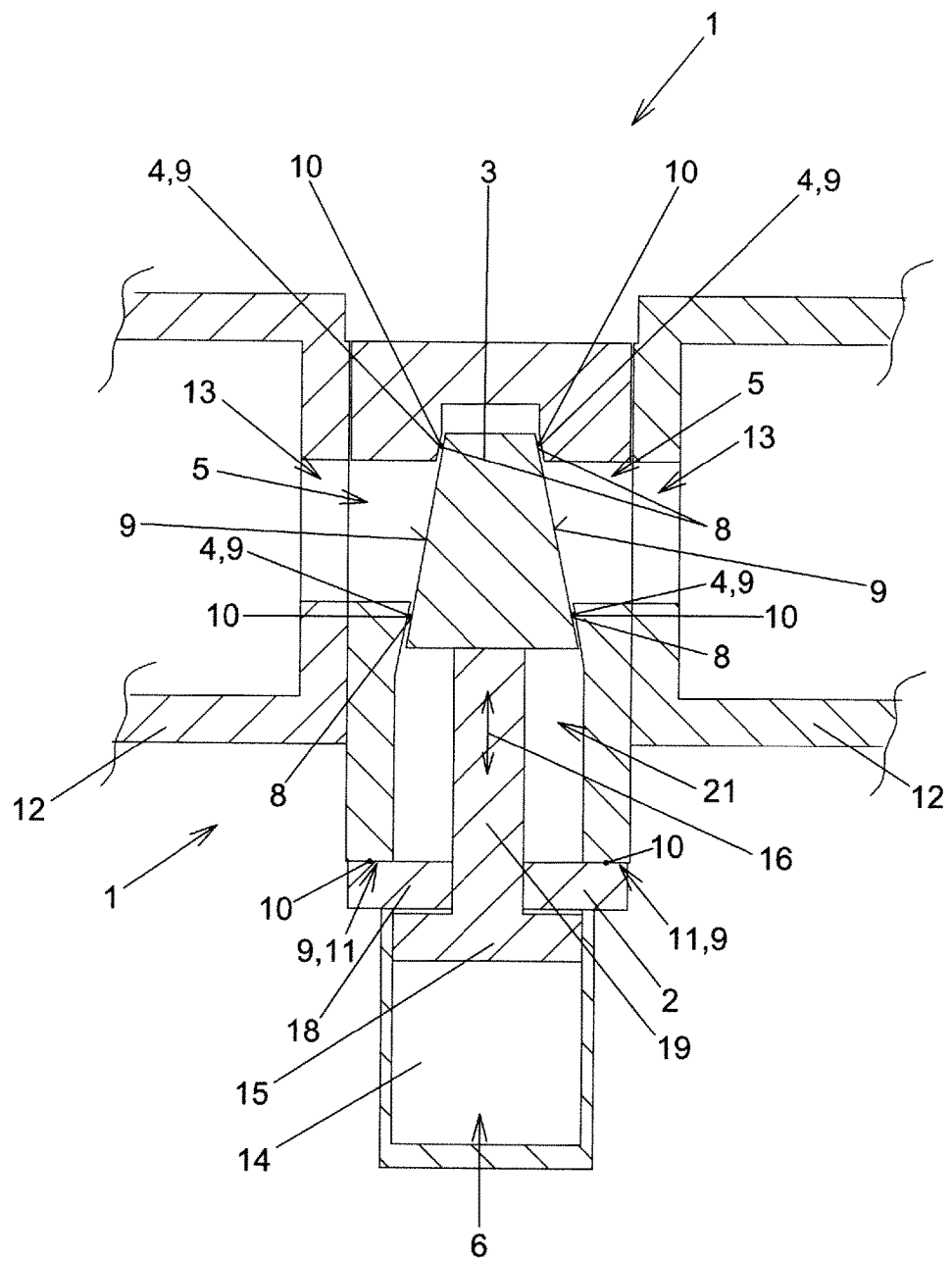
FIG. 8 shows a third exemplary embodiment of a valve according to the invention.

Finally, the exemplary embodiments in FIGS. 6 to 8 are intended to illustrate, by way of example, that smooth surfaces 9 in accordance with the invention can of course also be used in completely different valve types that are known per se. In the exemplary embodiment in FIGS. 6 and 7, the example thereof is what is known as a pendulum valve, in which the closure members 3, together with the valve rod 19, are not moved back and forth in a linear manner between the open position and the intermediate position, as in the first exemplary embodiment, but are pivoted about the axis 20 between these positions in the directions of movement 16 shown in FIG. 7. The movement of the closure members 3 between the intermediate position according to FIG. 6 and the closed position takes place, as in the first exemplary embodiment, in the second directions of movement 17 by the closure member drives 7.

FIG. 7 shows a side view, from the direction of one of the closure chambers 12, of the valve 1, embodied here as a pendulum vacuum valve, according to FIG. 6 once again, with a valve housing 2 illustrated in a transparent manner. FIG. 7, too is a highly simplified, schematic drawing. The closure members 3 and the valve rod 19 are located, in the illustration by way of solid lines in FIG. 7, in the intermediate position according to FIG. 6, in which the closure members 3 are already covering the valve opening 5 but have not yet been pressed against the valve seats 4. In addition, FIG. 7 also illustrates the open position of closure member 3 and valve rod 19 by way of dashed lines. FIG. 7 clearly reveals how the closure members 3 together with the valve rod 19 are pivoted back and forth about the pivot axis 20 between the intermediate position and the open position in the first directions of movement 16 by the closure member drive 6. This is known per se and does not have to be explained in any more detail, as is also the case for the sealing off (not illustrated in detail here) of the valve rod 19 from the valve housing 2, which can be achieved for example by a corresponding bellows-type seal or the like.

Apart from the outlined differences in the movement of the closure members 3 between the open position and the intermediate position, this second exemplary embodiment according to FIGS. 6 and 7 is otherwise embodied in exactly the same way as the first exemplary embodiment, and so reference can accordingly be made to the above description.

This goes in particular also for the configuration according to the invention of the different surfaces 9 and the advantages achieved thereby.

FIG. 8 schematically shows, by way of example, a third type of valve 1, or vacuum valve, in which smooth surfaces 9 according to the invention can be used. The valve in this case is what is known as a wedge valve in which the closure member 3 is formed in a wedge-shaped manner. This valve 1 requires only a single closure member drive 6, which adjusts the closure member 3 between the closed position shown in FIG. 8 and the open position (not illustrated here), in which the valve member 3 clears the valve opening 5. In this exemplary embodiment, the movement of the closure member 3 takes place only in the first directions of movement 16, that is to say only in a linear manner in one direction and in the opposite direction. Such wedge valves are known per se and do not have to be explained in more detail. According to the invention, however, provision is now also made in this exemplary embodiment for the valve seat 4, the sealing seat 11 and also all of those sub-regions of the valve housing 2 and of the closure member 3 that come into contact with process fluids or gases during operation of the valve 1 to be equipped with surfaces 9 according to the invention which have an average roughness depth RZ of less than or equal to 0.4 μm, preferably less than or equal to 0.25 μm.

Otherwise, where applicable, reference can be made to the first exemplary embodiment and the description thereof, and so additional explanations for this third exemplary embodiment do not appear necessary.

Finally, reference is once again made to the fact that, apart from the explicitly shown valve types, it is of course also possible for a multiplicity of other valves and valve types to be equipped with surfaces 9 according to the invention. Without loss of generality, further examples that can be mentioned are angle valves and what are known as Monovat valves with only one closure member or closure disk, and ultimately, where applicable, all other valve types that are known per se. These can have one, two or more valve drives.

KEY TO THE REFERENCE NUMERALS

1 Valve
2 Valve housing
3 Closure member
4 Valve seat
5 Valve opening
6 Closure member drive
7 Closure member drive
8 Sealing surface
9 Surface
10 Seal
11 Sealing seat
12 Chamber
13 Chamber opening
14 Cylinder
15 Piston
16 First directions of movement
17 Second directions of movement
18 Cover
19 Valve rod
20 Pivot axis
21 Interior

The invention claimed is:

1. A valve, comprising at least one valve housing, at least one closure member, and at least one valve seat, wherein the valve seat surrounds at least one valve opening of the valve, at least one closure member drive that moves the closure member back and forth between at least one open position, in which the closure member at least partially clears the valve opening, and a closed position, in which the closure member is pressed against the valve seat by way of a sealing surface of the closure member in order to close the valve opening, and at least one surface of the valve has an average roughness depth RZ less than or equal to 0.4 μm and has a reflectance for electromagnetic radiation of at least 0.8.

2. The valve as claimed in claim 1, wherein the surface is a surface that is at least one of milled or turned to at least one of a shiny finish or optically reflective surface.

3. The valve as claimed in claim 1, wherein the surface is formed of aluminum or of an aluminum alloy or of stainless steel or includes such a material.

4. The valve as claimed in claim 3, wherein the surface is formed of a 5000 or 6000 series aluminum alloy or includes such a material.

5. The valve as claimed in claim 1, wherein the surface is formed on at least one of the valve seat or on the sealing surface of the closure member.

6. The valve as claimed in claim 5, wherein, in the closed position, a seal of the valve is pressed against the surface, and the seal is raised from the surface in the open position.

7. The valve as claimed in claim 1, wherein the surface is formed on a sealing seat of the valve, and a seal is permanently pressed against said sealing seat during operation of the valve.

8. The valve as claimed in claim 1, wherein the surface is formed at least in a subregion of at least one of the valve housing or of the closure member that comes into contact with process fluids during operation of the valve.

9. A method for producing a valve as claimed in claim 1, the method comprising at least one of milling or turning the surface to a shiny finish.

10. The valve as claimed in claim 1, wherein the valve is a vacuum valve.

* * * * *